(12) United States Patent
Kloosterman et al.

(10) Patent No.: US 8,478,446 B2
(45) Date of Patent: Jul. 2, 2013

(54) OXYGEN CONTROL SYSTEM FOR OXYGEN ENHANCED COMBUSTION

(75) Inventors: Jeffrey William Kloosterman, Allentown, PA (US); Mark Daniel D'Agostini, Ebensburg, PA (US); Kevin Boyle Fogash, Wescosville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1089 days.

(21) Appl. No.: 12/138,634

(22) Filed: Jun. 13, 2008

(65) Prior Publication Data

US 2009/0311642 A1   Dec. 17, 2009

(51) Int. Cl.
*F23N 1/02* (2006.01)

(52) U.S. Cl.
USPC ............... 700/274; 700/266; 702/31; 702/32; 422/78; 422/177; 422/180; 422/182; 422/183; 422/204; 422/643; 422/223

(58) Field of Classification Search
USPC .......... 700/266, 274; 436/143, 159, 136, 436/160; 422/78, 177, 180, 182, 183, 204, 422/643, 223
See application file for complete search history.

(56) References Cited

U.S. PATENT DOCUMENTS

| | | | |
|---|---|---|---|
| 3,689,773 A | 9/1972 | Wheeler | |
| RE33,464 E | 11/1990 | Gitman | |
| 6,277,268 B1 | 8/2001 | Khesin et al. | |
| 6,389,330 B1 | 5/2002 | Khesin | |
| 6,775,645 B2 | 8/2004 | Daw et al. | |
| 6,901,351 B2 | 5/2005 | Daw et al. | |
| 7,185,595 B2 | 3/2007 | D'Agostini et al. | |
| 7,197,880 B2 | 4/2007 | Thornton et al. | |
| 7,838,297 B2 | 11/2010 | Widmer et al. | |
| 7,913,632 B2 | 3/2011 | Jia et al. | |
| 2003/0093246 A1 | 5/2003 | Daw et al. | |
| 2004/0191914 A1* | 9/2004 | Widmer et al. | 436/55 |
| 2004/0231332 A1 | 11/2004 | Saucedo et al. | |
| 2005/0019715 A1* | 1/2005 | D'Agostini et al. | 431/4 |
| 2005/0058958 A1 | 3/2005 | Kobayashi et al. | |
| 2006/0116515 A1 | 6/2006 | Gahman et al. | |

(Continued)

FOREIGN PATENT DOCUMENTS

WO   2006116515   11/2006

OTHER PUBLICATIONS

D'Agostini, Mark Daniel, et al., "Combustion System with Precombustor", U.S. Appl. No. 61/100,372, filed Sep. 26, 2008.

*Primary Examiner* — Brian R Gordon
*Assistant Examiner* — Shogo Sasaki
(74) *Attorney, Agent, or Firm* — Michael K. Boyer; Larry S. Zelson

(57) ABSTRACT

A method of configuration of combustion process control. The method includes providing a combustion system having a plurality of burner elements, a plurality of gas injection points and a controller. The gas injection points are configured to provide a support gas. One or more tasks for operation of the combustion system are determined. A plurality of groupings of the gas injection points are determined for each of the one or more tasks. An individual ranking for each of the plurality of groupings is determined in response to the one or more tasks. A composite ranking of injection points in response to the individual rankings and the controller is configured to operate the plurality of gas injection points in response to the composite ranking. A combustion system and a method for operating a combustion system are also disclosed.

11 Claims, 4 Drawing Sheets

U.S. PATENT DOCUMENTS

| | | |
|---|---|---|
| 2008/0264310 A1 | 10/2008 | Jia et al. |
| 2009/0308331 A1* | 12/2009 | D'Agostini et al. ....... 122/13.01 |
| 2010/0077941 A1 | 4/2010 | D'Agostini et al. |
| 2010/0077942 A1 | 4/2010 | D'Agostini et al. |
| 2010/0077943 A1 | 4/2010 | Fogash et al. |
| 2010/0077944 A1 | 4/2010 | Slavejkov et al. |
| 2010/0077945 A1 | 4/2010 | Hendershot et al. |
| 2010/0077946 A1 | 4/2010 | D'Agostini |
| 2010/0077968 A1 | 4/2010 | Hendershot et al. |
| 2010/0081098 A1 | 4/2010 | D'Agostini et al. |
| 2010/0081099 A1 | 4/2010 | Kloosterman et al. |

\* cited by examiner

OXYGEN CONTROL SYSTEM FOR OXYGEN ENHANCED COMBUSTION

BACKGROUND OF THE INVENTION

The present disclosure is directed to burner operation in furnace or boiler applications. In particular, the present disclosure is directed to burner operation during the combustion of a low-volatile solid fuel such as petroleum coke, including in a relatively non-steady operations.

Injection of substantially pure oxygen has been applied to combustion processes in the steel, glass, and cement industries for years. Production and efficiency benefits from selective oxygen injection for those industries is well-known. More recently, uses of oxygen injection in utility boilers has become more prevalent with applications directed towards emissions reductions, efficiency improvements, as well as in the capture of $CO_2$. The injection of oxygen has also been used to demonstrate the combustion of lower rank fuels such as petroleum coke.

The complexity of the burner ranges and may be dependent upon application. In addition, the burners may have multiple adjustments to positional settings. For example, utility boiler air-fuel burners have settings for swirl applied to air, damper positions to balance air flow to multiple burners and nozzle positions adjustments, which may or may not be automated and tied into a control system. Advances in control systems have made it possible to adjust the mentioned variables online, along with traditional adjustments like combustion air fan settings. Oxygen enriched combustion adds another factor in which to control combustion. However, the consequences of mismanaging the oxygen flow supply and distribution can be as severe as damaging the burner or surrounding surfaces. Pure oxygen is expensive and changes in oxygen flow and distribution are frequently made to maintain stability and efficiency of the combustion process.

For example, in some applications oxygen supply would entail a large air separation unit which once built cannot be easily expanded for additional supply. The maximum available oxygen will be substantially fixed. As such, unanticipated large oxygen demands by the combustion system may result in unacceptably low oxygen flow rates at injection points throughout the combustion system. The minimum oxygen supply will be fixed by the turndown rate. In addition oxygen supply rate cannot be adjusted instantaneously in the event of changes in oxygen demand by the combustion system.

Oxygen is typically generated for use by several industrial methods. One of the most common oxygen generation methods is the cryogenic separation of air to produce oxygen (in various purities) and other by-products (typically, nitrogen and argon). The product oxygen can be either gaseous or liquid in form and is usually produced in tonnage quantities (from 25 tons per day of oxygen and up to 5000 tons per day of oxygen). Newer systems may enable even greater production rates of oxygen from a single air separation unit. The liquid oxygen produced (if any) can be stored in liquid tanks for either transport or latter use. A back-up supply of liquid oxygen may also be used in conjunction with an air separation unit. Alternatively, oxygen can be generated via a pressure swing/vacuum swing operation over adsorbent beds. Other processes, such as membrane based systems, can also produce an oxygen predominant stream. Other off-gas streams may be available to provide an oxygen stream. In all the systems, a given amount of oxygen can be supplied at a given time. If more oxygen is required, either time is needed to increase the supply via process conditions or supplement supplies must be accessed. However, it is preferable that the process utilizing the oxygen is not directly affected during this transition. In addition, there are cases where no additional oxygen can be supplied. For example, the oxygen demand is greater than the supply, or there is a bottleneck in the supply, or there is a transport limitation (control valve limit for pipe supply or road limit for truck supply). In all these cases, it is important to maintain the combustion process.

A purpose of oxygen enrichment in combustion applications, particularly those involving high moisture, low volatile or low Btu solid fuels, is the enhancement of flame stability. For applications employing several burners, the continuous optimization of oxygen injection to the various endpoints becomes a significant challenge, and the penalty of non-optimal operation can be substantial. As an example, lower than optimal oxygen enrichment to a burner operating in a steam-generating boiler can result in a loss-of-flame condition that will trigger the shutdown of a mill with subsequent shutdown of an entire row of burners and, hence, an unplanned loss of steam generation. Conversely, higher than desirable oxygen enrichment can dramatically increase NOx emissions and, in a worst-case scenario, can potentially result in high-temperature burner or water-tube failures.

What is needed is a method for combustion system operation and management of support gas flow rates from a substantially fixed source of support gas to a plurality of burners firing in a combustion system, such as a boiler or furnace. In particular, what is further needed is a method and system for combustion of fuel in a relatively non-steady application such as a steam generating boiler used for production of electric power, wherein the supply of oxygen is substantially fixed and may vary.

BRIEF SUMMARY OF THE INVENTION

One aspect of the present disclosure includes a method for configuration of combustion process control. The method includes providing a combustion system having a plurality of burner elements, a plurality of gas injection points and a controller. The gas injection points are configured to provide a support gas. One or more tasks for operation of the combustion system are determined. A plurality of groupings of the gas injection points are determined for each of the one or more tasks. An individual ranking for each of the plurality of groupings is determined in response to the one or more tasks. A composite ranking of injection points in response to the individual task rankings and the controller is configured to operate the plurality of gas injection points in response to the composite ranking.

Another aspect of the present disclosure includes a method for operating a combustion process. The method includes providing a combustion system having a plurality of burner elements, a plurality of gas injection points and a controller. The gas injection points are configured to provide a support gas. A support gas flow is determined and support gas is provided to injection points in response to a composite ranking assigned to each injection point. The composite ranking is a composite value of a ranking of groupings of the injection points for each of the one or more tasks. The plurality of gas injection points are operated in response to the composite ranking.

Still another aspect of the present disclosure includes a combustion system having a plurality of burner elements, a plurality of gas injection points and a controller. The controller is capable of providing support gas to injection points in response to a composite ranking assigned to each injection point, the composite ranking being a composite value of a grouping of the injection points for each of the one or more tasks.

The invention solves the problem of how to run a stable combustion process that requires an external oxygen supply when the oxygen supply is limited. The main benefit is a stable combustion process for the production of steam and/or power. A side benefit is the need for excess capacity in the external oxygen supply may be reduced or eliminated which will save both power and capital.

Other features and advantages of the present invention will be apparent from the following more detailed description of the preferred embodiment, taken in conjunction with the accompanying drawings which illustrate, by way of example, the principles of the invention.

BRIEF DESCRIPTION OF SEVERAL VIEWS OF THE DRAWINGS

Wherever possible, the same reference numbers will be used throughout the drawings to refer to the same or like parts.

DETAILED DESCRIPTION OF THE INVENTION

Figure 1:
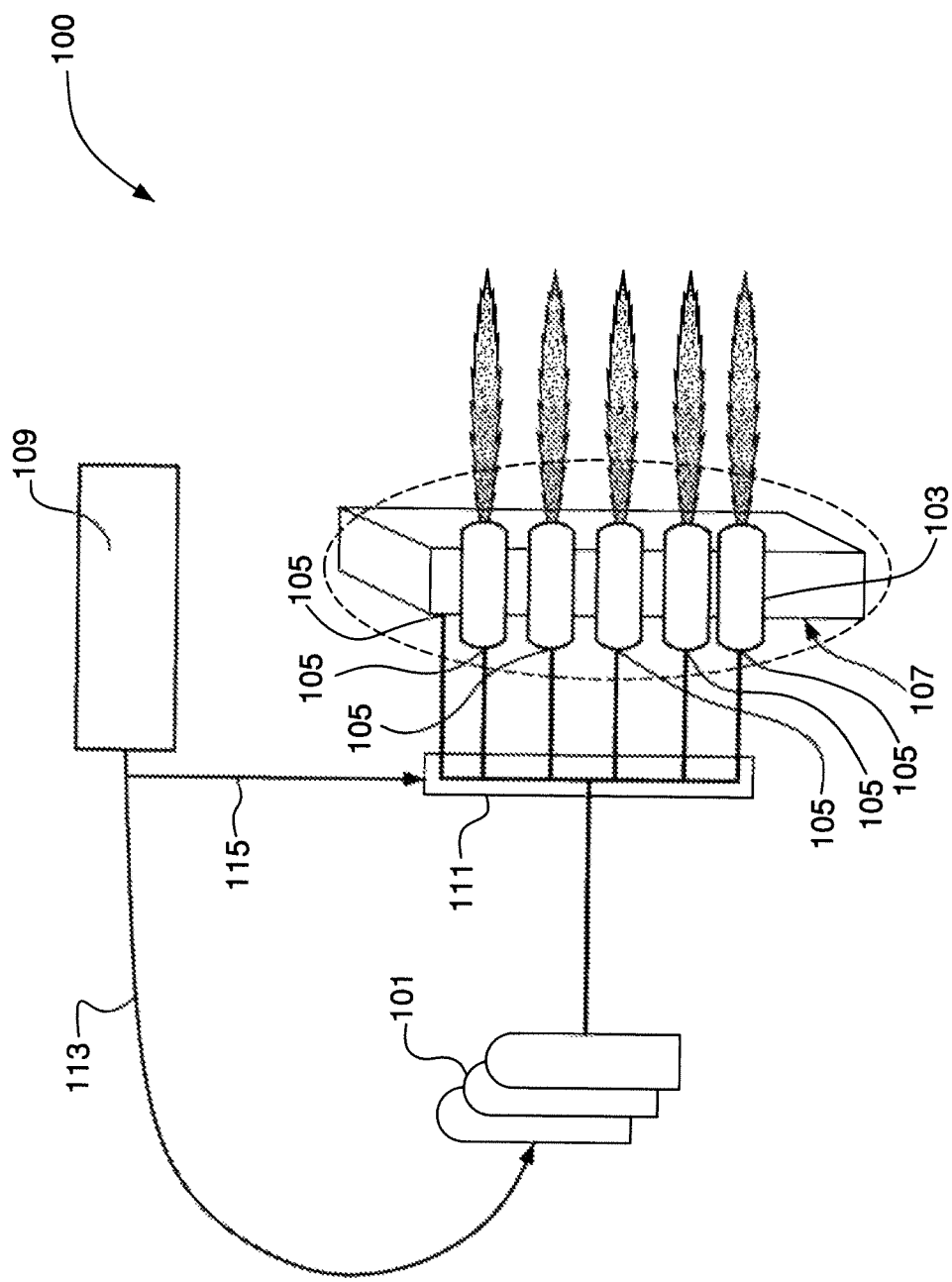
FIG. 1 shows a combustion system according to an embodiment of the disclosure.

One embodiment according to the present disclosure includes a system where the support gas supply for a given gas supplemented combustion process is limited and a preference as to support gas injection location must be made. Support gas, as utilized herein, includes a gas that provides a desirable combustion property when provided to the combustion process. For example, the support gas may provide a more stable flame, lower emissions, increased heat transfer, increased efficiency, temperature control, or any other desirable combustion condition. Suitable support gas may include, but is not limited to, oxygen, natural gas, carbon monoxide and hydrogen. In particular, in applications wherein the support gas is oxygen, the oxygen may be supplied to the various injection points within the combustion system. In one embodiment, the system may include a combination of the combustion process, externally generated oxygen, and a method for allocating the limited oxygen supply among a plurality of burners and/or other oxygen injection points firing to supply energy for the production of steam and or power. Certain embodiments of the disclosure utilize selective and controlled oxygen enrichment to enhance the combustion process. The oxygen enrichment provides a) greater turndown via increased flame stability, b) lower emissions than mere air firing, c) increased radiant heat transfer within the combustion zone, d) increased boiler thermal efficiency and e) increased boiler fuel-throughput. Injection of support gas can be provided by any nozzle or injection device known in the art for gas injection.

Certain embodiments of the present disclosure include systems and methods for combusting solid fuel. As used herein, the term "solid fuel" refers to any solid fuel suitable for combustion purposes. For example, the invention may be used with many types of solid fuels, including but not limited to: anthracite, bituminous, sub-bituminous, and lignitic coals; tar; bitumen; petroleum coke; paper mill sludge solids and sewage sludge solids; wood; peat; grass; and combinations and mixtures of all of those fuels. The methods may also include combustion of substantially unaltered low volatile solid fuel excusive of grinding, pulverizing and/or micronizing of the solid fuel for pneumatic transport. Such solid fuel may include physically and/or chemically unaltered solid fuel products or byproducts from the refinery processes or other sources and may contain less than 20% volatile content (as determined by ASTM D3175). While not so limited, for example, combustion of petroleum coke according to these embodiments may occur within a horizontally fired utility boiler with little (<20%) or no support fuel. In addition, while not so limited, the systems and methods of the present disclosure may be applicable to wall fired, corner fired and turbo furnace arrangements for suspension burning. The present disclosure is not limited to solid fuel combustion and may include combustion of liquid fuels, such as fuel oil or gaseous fuels, such as natural gas.

The combustion system includes combustion processes where externally generated support gases are supplied and that supply is limited. For example, the support gas may be oxygen and the oxygen source may be cryogenic, membrane, pressure swing, liquid supply or off-gas supply based or any other methods for obtaining a fixed oxygen supply. Within the combustion chamber, the combustion reaction occurs and releases heat for either use in a heat absorbing process or generation of steam for use in either power generation or other steam utilizing process. The combustion system may be fired with gaseous fuel, liquid fuel, solid fuel, or any combination of the preceding fuel types. Cases may arise where the oxygen supply is insufficient to meet the needs of all the oxidant injection points. In those cases, choices arise as to where to inject the limited oxygen supply. The invention is a system where the oxygen supply for a given combustion process is limited and a preference must be made in where the available oxygen is supplied to the various injection points. Changes in the preferential order and reallocation of oxygen therein are also a feature of this invention. The overall invention encompasses the combination of the combustion process, externally generated oxygen, and a method for allocating the limited oxygen supply amongst a multiplicity of burners firing within the combustion process to supply energy for the production of steam and or power.

FIG. 1 shows an exemplary combustion system 100 according to an embodiment of the present disclosure. The system 100 includes a gas supply 101 providing support gas to a plurality of burners 103. As shown, the support gas is provided at a plurality of injection points 105. The injection points 105 are arranged at burners 103 and into windbox 107. The injection points are preferably gas nozzles configured to deliver support gas to the desired location. While the injections points are shown as being associated with the burner 103 and/or windbox 107, the disclosures is not so limited and may include injection points at other locations in the combustion system 100. A controller 109 provides controlled supply of support gas to the injection points 105. The controller 109 may include one or more components, including a plurality of separate individual components, such as processing, data acquisition, or other control devices, that are arranged to provide control and data management for support gas injection. A manifold 111 is provided to provide controlled and varied flow rates to the particular injections points. Manifold 111 further includes valving arrangements or other suitable flow control devices to provide the controlled flow. The control of support gas flow is sufficient to control support gas flow to individual injection points 105 or groups of injection points 105. Controller 109 determines the amount of supply gas available via supply gas line 113 and provides control signals to the manifold 111 via control line 115.

For the combustion system 100, several injection points of oxygen are available. The injection points 105 can range from direct oxygen injection to low level enrichment of air to enrichment of other streams. Often, the oxygen can be used for stabilization of the flame or for general combustion characteristics. In some cases, oxygen is used to enrich a recycled flue gas stream (FGR) to moderate the flame conditions. In such a case, oxygen can be added to the FGR to enable combustion using the combined stream as the main oxidant stream. Another embodiment includes the use of oxygen to supply oxidant demand to reduced or eliminate the supply of air which would enable a flue gas concentrated in $CO_2$. A substantially pure oxygen stream may permit either improved efficiency operations and/or to concentrate up the level of $CO_2$ in the flue gas to permit easier capture.

Figure 2:
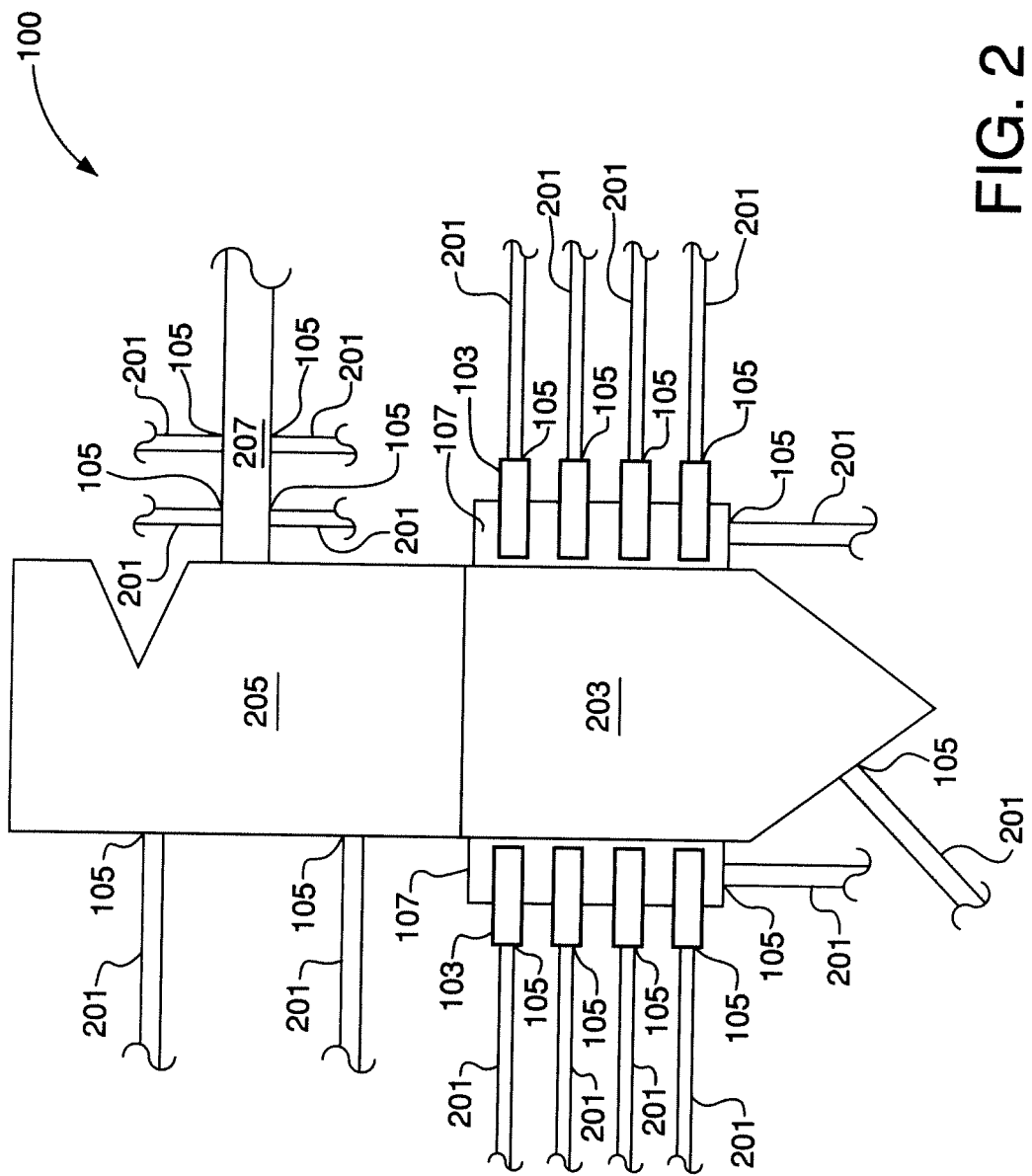
FIG. 2 shows a combustion system according to another embodiment of the disclosure.

FIG. 2 shows another example of a combustion system 100 according to another embodiment of the disclosure. This embodiment includes a boiler arrangement having a plurality of burners 103 arranged about a main combustion zone 203. Support gas lines 201 provide support gas to injection points 105 at the burners 103 and to the main combustion zone 203. In addition windbox 107 also includes injection points 105 fed by support gas lines 201. The number of burners 103, the number of injection points 105 and the configuration of support gas lines 201 is not limited to the arrangement shown and may include any arrangement that provides supported combustion.

Combustion takes place in main combustion zone 203 and is supported by injection of support gas at burners 103, into windbox 107 and into the main combustion zone 203. In one embodiment support gas is oxygen. The products of combustion are carried to the secondary combustion zone 205, wherein an additional two injection points 105 provide support gas from support gas lines 201. Further the secondary oxidant stream 207, e.g. overfire air or oxygen enriched FGR, includes four injection points 105 providing support gas from support gas lines 201. While the above has been shown and described with respect to a boiler system, other types of combustion systems may also utilize the present method and system for support gas flow control. For example, suitable combustion systems may include furnace systems, utility boiler systems, and material melting systems, such as glass or metal melting. The supply gas provided to the injection points 105 are prioritized according to a task, an associated grouping of injection points 105 and a ranking of the groupings of injection points 105.

In certain applications, support gas supply may be insufficient to meet the needs of all the injection points in the combustion system 100. In those cases, choices arise as to where to inject the limited oxygen supply. Certain embodiments of the disclosure include systems where the support gas supply for a given combustion process is limited and a preference must be made in where the available support gas is supplied to the various injection points.

Combustion systems 100 according to the present disclosure are capable of both control and allocation of supply gas to injection points 105. Control may include online adjustment of the combustion processes based on feedback or other parameter. Allocation, may be based on a distribution based on a set of conditions for a fixed supply of oxygen with a particular objective in mind, i.e. stability, emissions, combustion efficiency. In addition, active control of allocation can be done by providing feedback on how well the objective criterion has been satisfied, permitting the use of a control loop. The feedback to any control process can be continuous, as is the case with online monitoring, or discontinuous based on intermittent input, from an operator or other user, for example.

Certain embodiments of the present disclosure include prioritizations at a plurality of levels of process detail for the allocation of oxygen in combustion processes to achieve desired process and/or operating objectives. The prioritization focuses on ranked list of operational objectives or "tasks" to fulfill. Tasks could include, but are not exclusive to, limiting emissions profile, i.e. NOx, SOx, and flue gas O2 content, combustion efficiency, including unburned carbon and CO, heat absorption characteristics, flue gas exit temperature and heat flux profile in radiative section for example, as well as flame stability. Stability of the flame is typically one task utilized for efficient operation of a combustion system. The placement, mixing, enrichment and number of oxidant injection streams have a significant effect on the stability of the flame. Substantially pure oxygen has been shown to stabilize combustion of lower rank fuels such has been shown in U.S. Pat. No. 7,185,595, which is hereby incorporated by reference in its entirety, for 100% firing of low volatile petroleum coke in a wall-fired utility boiler. Enrichment of air can also enhance the stability of a burner as is also disclosed in U.S. Pat. No. 7,185,595. Additional staging of oxidant, like overfire air, effects stability of the flame. Substantially pure oxygen injection into staged oxidant stream, i.e. oxygen enrichment of secondary or staged air stream, or as the staged oxidant stream can have an additional affect on stability. Oxygen injection into secondary or over-fire oxidant streams also applies to applications where flue gas recycle is utilized as the bulk of the stream. The degree to which the oxygen injection takes place into the secondary or over-fire oxidant streams depends on the configuration of the burner, the extent of the staging, locations of the injection points, and the geometry of the combustion space. The control of the quantity and placement of substantially pure oxygen within the combustion space is provided to enhance the stability of the flame.

Figure 3:
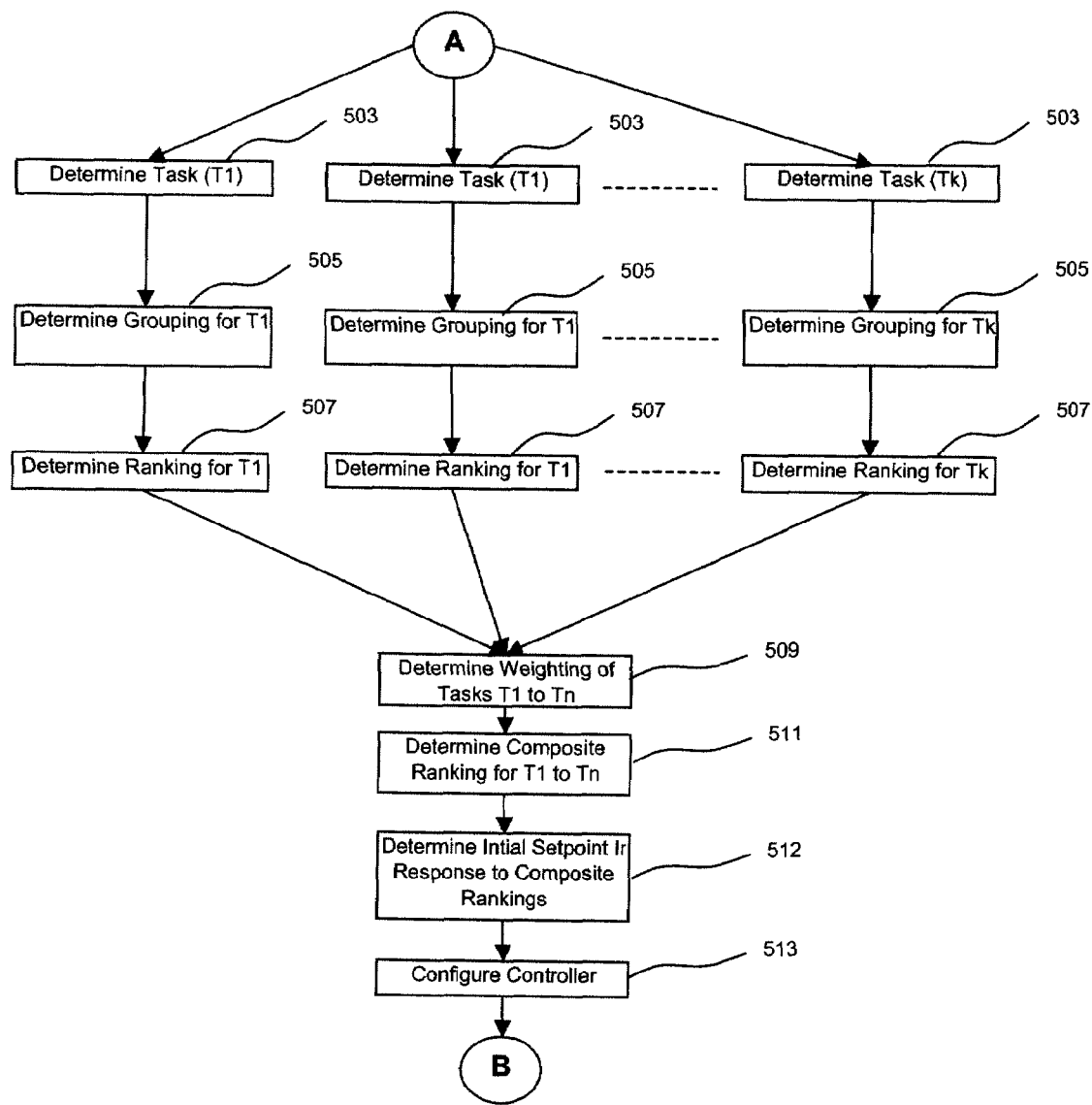
FIG. 3 shows a process flow diagram for a configuration method according to an embodiment of the present disclosure.
Figure 4:
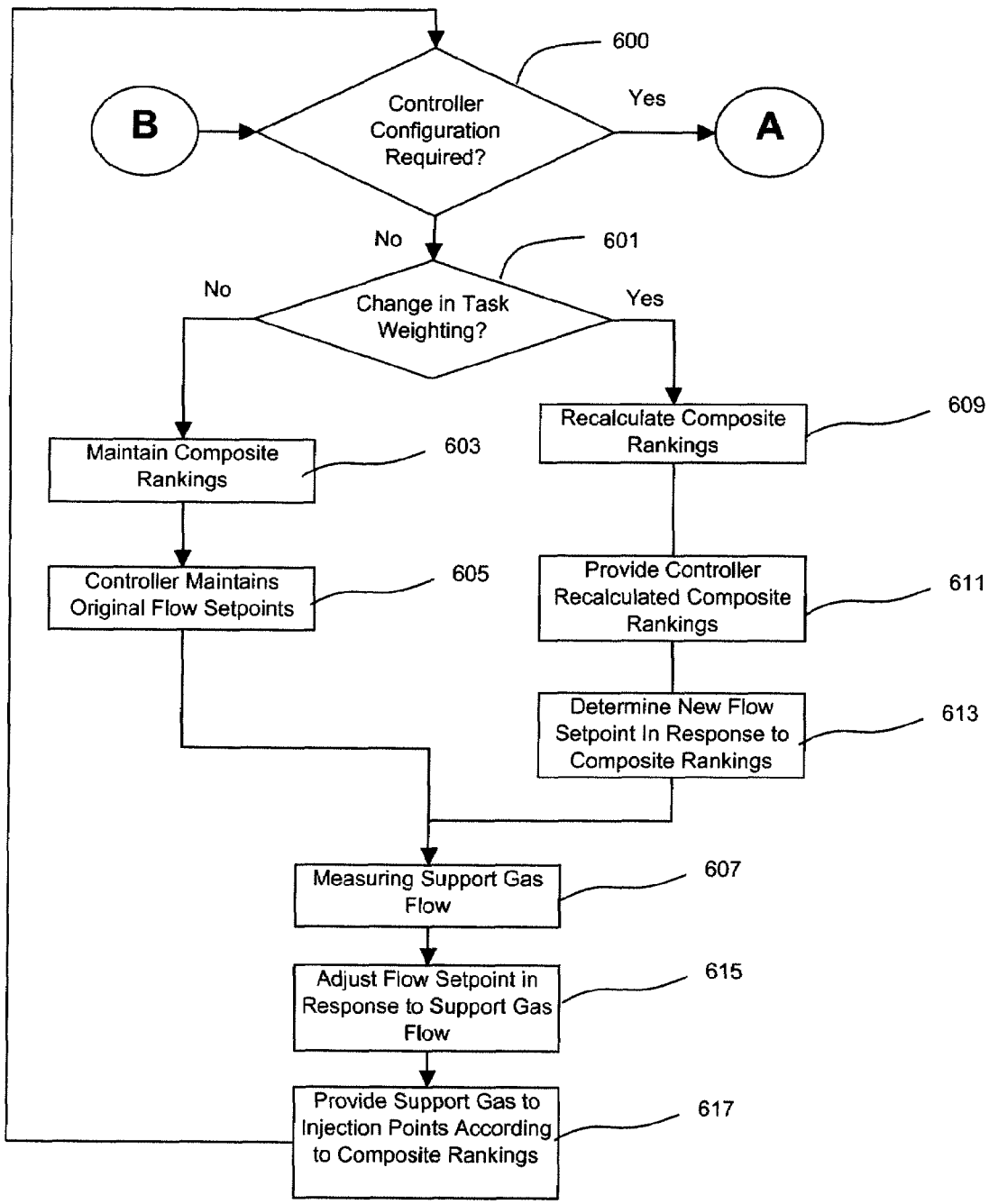
FIG. 4 shows a process flow diagram for an operational method according to an embodiment of the present disclosure.

FIGS. 3 and 4 shows a process flow for the configuration and operation of a controller 109, respectively, according to an embodiment of the disclosure. To begin configuration a need for configuration is determined (see step 600, FIG. 4). The configuration may be periodic, or user requested as desired for control, operation and/or maintenance. If configuration is required ("YES" in FIG. 4), the process begins a configuration method according to the present disclosure (shown as "A") in FIGS. 3 and 4. Thereafter, at least one task is determined, step 503. The determination of the tasks to be utilized for allocation is application dependent and will include factors such as the factors discussed above. The number of tasks may include up to $T_k$ tasks, k being the total number of tasks to be considered for the allocation of support gas.

For each task, support gas injection points are grouped and may be further divided into one or more subgroupings, step 505. Prioritization of support gas injection points varies based on task. The prioritization of an individual injection point can be disparate in some cases like flame stability and NOx emissions. Those skilled in the art of combustion can reasonably approximate initial conditions and settings from which combustion processes are then further optimized. This invention incorporates this expert knowledge base in the form of prioritizing oxygen injection points.

The injection points are then ranked for each of the desired tasks, step 507. Ranking, as used herein, is a level of priority, or importance of the groupings of injection points. The ranking can be to a fine level of detail, as specific injection point can be ranked, or based on groupings of injection points. The grouping on injection points offers various levels for control based on the size of the grouping, i.e. by combustion zone, purity or locations.

One embodiment of the disclosure includes initial grouping of injection points based on the injection point or points within the combustion zone. The size and location of each of the combustion zones are application dependent. Zones may be ranked on importance for each task and constitutes the first layer of detail in prioritizing injection points.

Other embodiments may include further ranking of injection points based on the purity of enriched stream as it enters the combustion space. The level of division between relatively "higher" vs. "lower" purity streams can generally be drawn at 28% $O_2$ content in the stream based on carbon steel material constraints. Those streams at or below 28% are of lower purity and those above 28% of higher purity. Streams with oxygen contents of higher purity are innately considered of higher priority or ranking over those of lower purity. Circumstances may arise that would lead to the change in the 28% $O_2$ demarcation. Other embodiments include further ranking of the purity grouped injection points based on location within the combustion zone. At this fine level of detail the single points of injection can be ranked against each other. However, groups of injection points of equal priority can still exist. The specification at this level of detail is very application and injection technology dependent with one skilled in the art providing the prioritization.

Rankings can be recorded in any suitable manner. For example, 1 to n rankings where n is the number of injection points can be used or can be weighted to give a nonuniform distribution to the priorities. The rankings at the individual task level are preset by one of ordinary skill in the art and can be retuned in the field, but remain unchanged during normal operation of the plant.

The relative priority of tasks, however, can change based on operating conditions. As shown in FIG. 3, the weighting or priority of tasks is determined, step 509. The changes in the relative ranking (i.e. weighting) on a task level may be used to reallocate oxygen amongst the distribution points on an as needed basis such as during combustion system operation. Reallocation of oxygen may include the addition or removal of oxygen to/from lower priority injection point(s) from/to the higher priority injection point(s). The amount is governed by a fixed or variable step size and the direction, e.g. addition or removal. For example, an operator or other user may identify an operational deficiency and increase the weighting of one or more of the tasks in response.

After weighting is completed, a composite ranking is determined, step 511. The composite ranking ranks the n injection points, with respect to a combination of their respective k task rankings. Thereafter, an initial setpoint for the support gas flow to burners 103 is determined to coincide with the composite rankings, step 512. After the setpoints are determined, the controller 109 is configured, step 513. The controller 109 is configured such that the settings of supply gas flow are set and the support gas can be provided according to the priority given by the composite ranking. The method returns to the operational method and continues with the determination of whether controller configuration is required, step 600 (shown as "B" in FIGS. 3 and 4).

In order to configure the controller, the initial flows for each of the injection points are set. Set points can be based on previously available data from other operating units. However, the method does not preclude initial set point based on fundamental models, by other means of calculation, determination in the field, or by arbitrary determination. The configuration of the controller is not fixed and can be altered periodically. However, the configuration is not changed during normal operation.

A general example of composite ranking starts from the initial ranking of all the oxygen injection points. Each ranked point can be given an indexed value for each task. The composite ranking of a specific injection point can be mathematically expressed as $$R_j = \sum_{i=1}^{k} w_i I_{i,j} R_{i,j}$$

where the composite ranking of the jth injection point, $R_j$, is defined as the sum over k tasks of the product of the ith task weight, $w_i$, an index of the jth point for the ith task, $I_{i,j}$, and the ranking of the jth injection point for the ith task, $R_{i,j}$. The ranking of each individual point for the ith task, $R_{i,j}$, is based off the previously described relative ordering based on combustion zone, purity and location and is fixed during regular operation. The relative weights for each of the tasks one through k, $w_i$, is the component which changes under normal operation based on either discontinuous input into the control panel or continuous feedback control.

The indexing value is a measure of the relative importance between ranked points. For example, the value of $I^{i,j}$ is equivalent over all the jth injection points for a uniform distribution. For nonuniform distributions, the relative priority between rankings 1 and 2 does not necessarily have to be equivalent to the difference in priority between the rankings of 2 and 3 or any other combination of neighboring points. The indexing value can be described by a mathematical relation or can be user defined for each injection point. The value for the indexing can be fixed or variable. The indexing values may include higher priority items having a lower index such that the product of the index and rank yields values increasing in order of their ranking for the task and can further be multiplied with the appropriate task weight and summed to produce a composite ranking in which the lowest value of Rj is the highest ranked injection point or points.

Rankings for two separate tasks may be compared. For example, the fourth ranked injection point for NOx may be of greater weight or priority, and indexed accordingly, than the fourth ranked injection point for stability. However, the weight given to the stability task may cause the product of the weight, index, and task ranking for injection point to be of higher rank than the product of the weight, index, and task ranking for the fourth ranked injection point on the NOx ranking, and therefore be a overall higher ranked injection points.

Thus, an overall rank for a given injection location based on all tasks can be calculated for the plant and used as the basis of allocation of support gas according to the list of decreasing rank. Groups of equally ranked injection points can also be used to simplify the coding structure.

FIG. 4 shows a process flow diagram for the operation of a combustion system 100. As discussed above with respect to FIG. 3, a determination of whether configuration is required is made, step 600. If no configuration is required (indicated as "NO" in FIG. 4), a determination of whether a change in weighting is made, step 601. If no change in weighting has occurred (indicated as "NO" in FIG. 4), the composite rankings are maintained, step 603. Thereafter, the controller maintains original flow setpoints at controller 109, step 605. Thereafter the supply support gas flow is determined, step 607.

If a change of weighting has occurred (indicated as "YES" in FIG. 4), from determination step 601, the composite rankings are recalculated based upon the new weightings or priorities placed on the tasks, step 609. The controller 109 is then provided with the new composite ranking, step 611. The determination of support gas flows for each of the injection points can be done by means of any fixed or varying step size methodology for altering input variables based on a desired change in the output variables. Varying step size calculations include, but are not restricted to, calculating flow rates based on the differences between previous and current input variables, using normalization of the differences for calculation purposes, fundamental models, inferring from previously obtained data sets. The newly obtained set points are sent and retained in controller 109, step 613, wherein the process continues. The newly obtained set points will remain until the task weighting or other appropriate feedback mechanism based on the methodology is changed. Thereafter the supply support gas flow is determined, step 607.

The total flow for all the injection points determined in 613 is then compared to the supply support gas flow determined in 607 and the flow set point of the support gas is adjusted in response to the support gas flow determined in step 607, step 615. Thereafter, the controller 109 provides the support gas to the injection points, step 617. Supply gas is allocated by supplying the highest ranked, or highest priority, injection point first and then working down the ranking list. Specifically, the support gas flow determination includes determining the amount of support gas available and comparing the available support gas from supply to the required support gas calculated value, to fully supply the injection points 105 in the combustion system 100. The support gas is provided to the injection points in the order of the composite rankings, steps 603 and step 613. Under conditions where the oxygen supply is insufficient to supply the necessary oxygen, the lowest ranked points supply is sacrificed to fulfill the higher ranked items until additional oxygen can be supplied. Minimum flow requirements can also be imposed, if necessary. More drastic action, such as shutting down burners, inserting igniters, may be required if the oxygen supply is below a critical value.

Perturbations in conditions include demand that exceeds the limited oxygen supply. For example, air separation unit capacity limit reached or supply curtailment, ASU ramp rate can not match the rate of increase in demand, LOx availability or vaporization rate are all examples of demand exceeding supply. Support gas supply could be greater than demand in which case the extra support gas is put into the lowest priority injection points as an effective reservoir or simply vented to the atmosphere. This is in addition to changes in process conditions during normal operation. Stability problems, fuel quality changes, moisture levels, LOI values, emissions profile, boiler cleanliness, and boiler cleaning are all examples of changes to the operating conditions. Embodiments of the present disclosure permit dampening or eliminating transients in support gas supply by maintaining flows to the highest priority injection points.

The perturbations listed above may require adjustment to the relative weighting of tasks. Once the weighting of the task is changed, the overall relative rank of each injection point can be recalculated. Support gas flow may be adjusted proportional to the change in the value of $R_j$. The relative change in $R_j$ can be used in conjuction with a predetermined step size for alternating support gas flow for example. As stated before, the step size could be fixed or variable. As indicated before, allocation of support gas is from the highest to the lowest ranked injection points and therefore shortages/surplus may exist in overall support gas supply after initial changes are made to the relative ranking of task. Overall support gas supply can then be adjusted to compensate for under/over supply of oxygen to the combustion process. This, of course, can be done on a longer time scale as the more important changes to the highest ranked oxygen injection points has already been made.

Several different operating modes may be needed to properly distribute support gas effectively and efficiently. Operating under normal load conditions, nominally a high percentage, say 85%+ of maximum rated capacity, would proceed along one set of control parameters. Operation below 85% would be considered as a low load condition which could influence the prioritization of injection points resulting in a separate set of control parameters. Additional conditions that may have separate prioritizations are for start-up/shutdown, and boiler cleaning activities. The ranking injection points for each operating mode can be of the simple design, weighted design, or combinations there of.

Operator input may be made on a relative basis of each task in the denoted operating mode. Input into the system is therefore discretionary and may or may not be computer controlled. A fully automated scheme can be implemented utilizing feedback signals to control the relative rankings of the tasks. Conversely, certain embodiments may be used to perform the reallocation of flows commensurate with the change in flow rate due to external input into the invention. Objective values could be set for task and adjustments in relative rankings can be done by proportionally moving the weights of the tasks.

Individual burners may need focused support as stability may be worse in one burner over others in its group for a short time. This can be compensated by including means of stability control enhancement for the burner in question. This increases the relative weight for the specific oxygen location nearest the burner, likely an injection port in the burner, to correct for localized instabilities without having to call an expert to readjust all the rankings. The adjustments can be temporary or made permanent.

EXAMPLE

The process of the present disclosure may be applied to the use of oxygen enriched solid-fuel wall-fired boiler for power generation for purposes of reducing NOx emissions utilizing low level of oxygen enrichment. A schematic of a wall-fired boiler is shown in FIG. 2 and is illustrative for this example. Table 1 describes the combustion properties of interest in this illustrative example. The values in Table 1 are for a modest sized, ~500 MWe, utility boiler with 10.0% oxygen enrichment, or approximately 1,150,000 standard cubic feet per hour (SCFH) of oxygen. Thirty-two, 150,000,000 Btu/hr burners are situated in an opposed wall-firing configuration to provide heat to the boiler. A windbox on either side of the boiler introduces most of combustion air to the burners. A portion of combustion air is used to dry and convey the solid fuel, while the remainder is introduced as overfire air (OFA) in a zone, 205, above the combustion zone, 203. The oxygen is injected into the system at 38 different injection points. A highly enriched oxygen stream, >28% $O_2$ content, is introduced into the boiler locally at each of the 32 burners. A high purity oxygen stream is also used for low level enrichment, <28% $O_2$ content, of the combustion air entering the boiler through the two opposing windboxes, 107. The remaining four oxygen injection points, 105, are located in four separate ducts in the upper furnace for low level enrichment of the overfire air.

TABLE 1

| Description | Value | Units |
|---|---|---|
| Boiler Thermal Output | 1500 | MWth |
| Combustion Stoichiometry | 12 | lb air/lb fuel |
| Fuel Heating value (HHV) | 14,000 | Btu/lb |
| Oxygen Enrichment Level | 10.0 | % |
| Air Flow | 52,700 | MSCFH |
| Oxygen for Enrichment Flow | 1,150 | MSCFH |

The tasks of interest in this simplified example are flame stability and NOx emissions. Therefore, working through the structure illustrated in FIG. 3 yields two tasks in which the 38 injection points may be be grouped, ranked and indexed. First, the 38 injection points are grouped for the stability task by combustion zones, a main combustion zone consisting of 34 injection points and over-fire air zone consisting of four injection points. Then, the combustion zone is further grouped into 32 injection points locally to each burner and two injection points meant for general enrichment of the windbox combustion air. The three groups are then ranked for the stability task resulting in the group of 32 burner injection points ranked 1$^{st}$ followed by the group of windbox injection points and finally the OFA injection points. For simplicity, the NOx task is assumed to have the same three groupings of injection points as the stability task. The groupings of points are then ranked for the NOx tasks, resulting in the group of 32 burner injection points ranked 1$^{st}$ followed by the group of windbox injection points and finally the OFA injection points.

The final step is to assign an index to each of the groupings for each of the tasks. This establishes the relative importance of the three groupings of injection points for stability relative to the three groupings of injection points for NOx. The resulting groupings, rankings, and indices are shown in Table 2. At this point, an initial calibration of the control parameters is performed and initial weighting of the tasks, step 509 of FIG. 3, and flowrate for each of the injection point, step 512 of FIG. 3 are determined and the composite rankings calculated, step 511. The results of the initial set up are then provided to controller 109, step 513.

TABLE 2

| Systematic Grouping by | | Number of | Tasks | | | |
|---|---|---|---|---|---|---|
| Combustion Zone | Injection Points | Injection Points | Stability Rank | Stability Index | NOx Rank | NOx Index |
| Burner Zone | Burner | 32 | 1 | 0.05 | 1 | 0.10 |
|  | Windbox | 2 | 2 | 0.40 | 2 | 0.25 |
| Overfire Air Zone | Overfire Air Ports (OFA) | 4 | 3 | 0.80 | 3 | 0.60 |

The calculation for purposes of this example is the summation of a linear combination of the weights, rankings, and indices to produce the composite rankings for two operating points shown in Table 3. The first operating point is for an initial task weighting of 80/20, or a weight of 0.8 for the stability task to a weight of 0.2 for the NOx task. The task weighting for the second, new, operating point is 60/40, or a weight of 0.6 for the stability task to a weight of 0.4 for the NOx task. The algorithm used to determine the new set points for the 60/40 operating point is calculated using the difference in composite ranking for each grouping of injection points normalized to the initial 80/20 composite rankings. The normalized change is multiplied by a user defined step size to produce a relative change in oxygen flow rate for each group of injection points. The percent change for the group of injection points in then applied to each of the individual injection point set point flows by multiplying the percent change times the present set point value and adding it to the present set point value, step 613 of FIG. 4. The intermediate values and results of the calculation of new set points are shown in Table 3. The total flow for the 60/40 injection point, which is the sum of the oxygen flow to each injection point, is larger than for the initial 80/20 operating point, 1190 MSCFH vs. 1150 MSCFH. Step 615 compares the new operating points total flow to the existing flow, 1,190 and 1,150 MSCFH respectively, and a shortage in the oxygen supply of 40 MSCFH is calculated. The 40 MSCFH is taken from the set point flow of the lowest ranked group of injection points based on the composite rankings, in this example the OFA grouping. The new set point flows are then supplied to the controller 109 and actual oxygen flows are adjusted to obtain the new operating point.

TABLE 3

| Stability/ NOx weighting | Composite Ranking 80/20 | Composite Ranking 60/40 | Normalized % Change | % Change × Step Size | Flow Distribution (%) 80/20 | Flow Distribution (%) 60/40 |
|---|---|---|---|---|---|---|
| Burner | 0.06 | 0.07 | −16.7 | −25.0 | 35.0 | 25.4 |
| Windbox | 0.74 | 0.68 | 8.1 | 16.2 | 50.0 | 56.3 |
| OFA | 2.28 | 2.16 | 5.3 | 26.3 | 15.0 | 18.3 |
| Total Flow MSCFH | | | | | 1,150 | 1,190 |

As an ongoing measure, the operating loop shown in FIG. 4 periodically checks the calculated set points totaling an oxygen flow of 1,190 MSCFH against the current oxygen supply flow. The supply flow may be altered to produce the full 1,190 MSCFH needed for the 60/40 operating point. If such a case arose, the additional supply is allocated by the previously calculated set points to the OFA group of injection points. Additionally, if the oxygen supply were to exceed the 1,190 MSCFH calculated total flow, the surplus oxygen supply is directed to the OFA group of injection points as they are the lowest composite ranked grouping or the additional oxygen may be vented. In this manner, the effect of the shortage or surplus of oxygen is minimized by allowing the oxygen flows to vary in the least effective oxygen injection points of this example, OFA.

TABLE 4

| | Flow Distribution in % | | |
|---|---|---|---|
| Group Description | Initial | Calculated | Actual |
| | 80/20 | 60/40 | 60/40 |
| Burner | 35.0 | 25.4 | 26.3 |
| Windbox | 50.0 | 56.3 | 58.1 |
| OFA | 15.0 | 18.3 | 15.6 |
| Total Flow MSCFH | 1150 | 1190 | 1150 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for operating a combustion process comprising:
   providing a combustion system having a plurality of burner elements, a plurality of gas injection points and a controller;
   determining priority of one or more tasks for operation of the combustion system;
   determining a support gas flow available to the plurality of gas injection points;
   determining a composite ranking for each of the gas injection points based on the priority of the one or more tasks, wherein each of the gas injection points has a predetermined rank for each task;
   computing a support gas flow for each of the gas injection points based on the composite rankings;
   using the controller to allocate the support gas to the gas injection points in response to the composite ranking determined for each of the gas injecton points and the available support gas flow, wherein when the available support gas flow is less than a sum of the support gas flow computed for each of the gas injection points, the controller allocates the support gas to the gas injection points in order of composite ranking from highest to lowest; and
   delivering support gas to each of the injection points as allocated by the controller.

2. The method of claim 1, further comprising determining the groupings of the gas injection points and determining composite rankings of the groupings of gas injection points.

3. The method of claim 1, wherein the composite ranking for each of the gas injection points further includes a weighting of the one or more tasks provided by a user.

4. The method of claim 1, wherein the support gas is oxygen.

5. The method of claim 4, wherein the combustion system is configured to combust solid fuel.

6. The method of claim 1, wherein the combustion system is a utility boiler.

7. The method of claim 5 wherein the solid fuel comprises coal.

8. The method of claim 5 wherein the solid fuel comprises petroleum coke.

9. The method of claim 1 wherein the combustion system includes a manifold configured to provided varied flow rates to each of the plurality of injection points; and
   wherein the controller provides control signals to the manifold via a control line to control the support gas delivered to each of the iniection points as allocated by the controller.

10. The method of claim 1, further comprising:
    reallocating, in response to a perturbation in the support gas flow available, the support gas to the gas injection points.

11. The method of claim 1, wherein when the available support gas is greater than the sum of the support gas flow computed for each of the injection points, the controller allocations excess support gas to the gas injection point with the lowest composite ranking.

* * * * *